Figure 4:
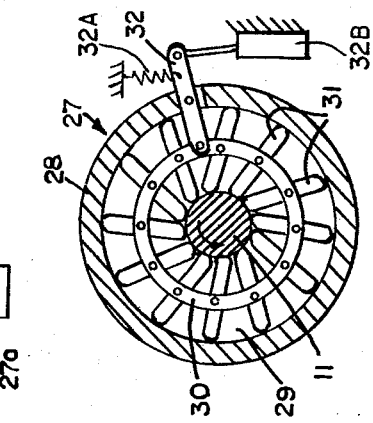

July 18, 1967
W. F. TIBBETTS
3,331,251
APPARATUS FOR TESTING OBJECTS WITH FORCE GENERATED
BY SUDDENLY RELEASED ENERGY
Filed Aug. 21, 1964
5 Sheets-Sheet 1
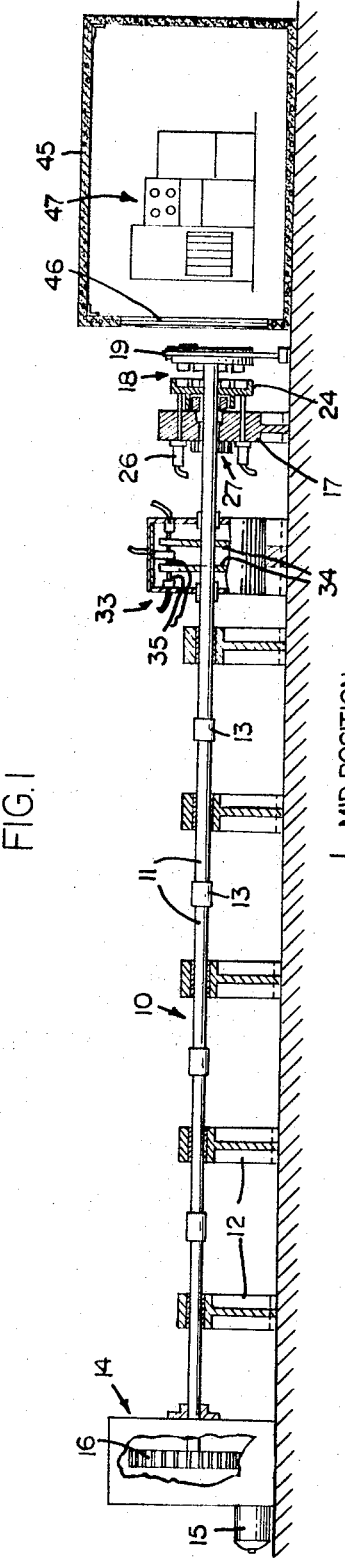
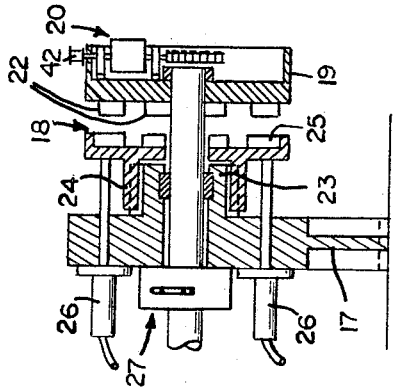
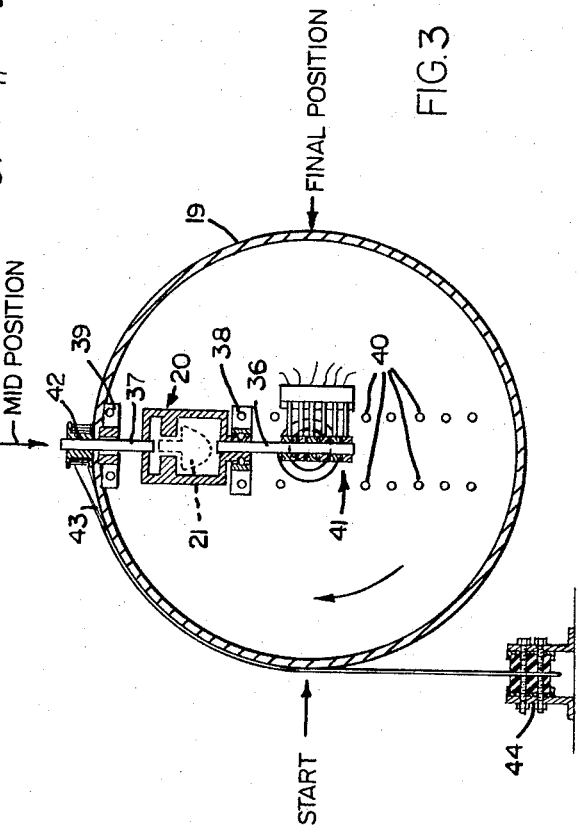
INVENTOR
Willis F. Tibbetts
BY
Albert Spear,
ATTORNEY July 18, 1967   W. F. TIBBETTS   3,331,251
APPARATUS FOR TESTING OBJECTS WITH FORCE GENERATED
BY SUDDENLY RELEASED ENERGY
Filed Aug. 21, 1964   5 Sheets-Sheet 2

INVENTOR
Willis F. Tibbetts
BY
Abbott Spear,
ATTORNEY

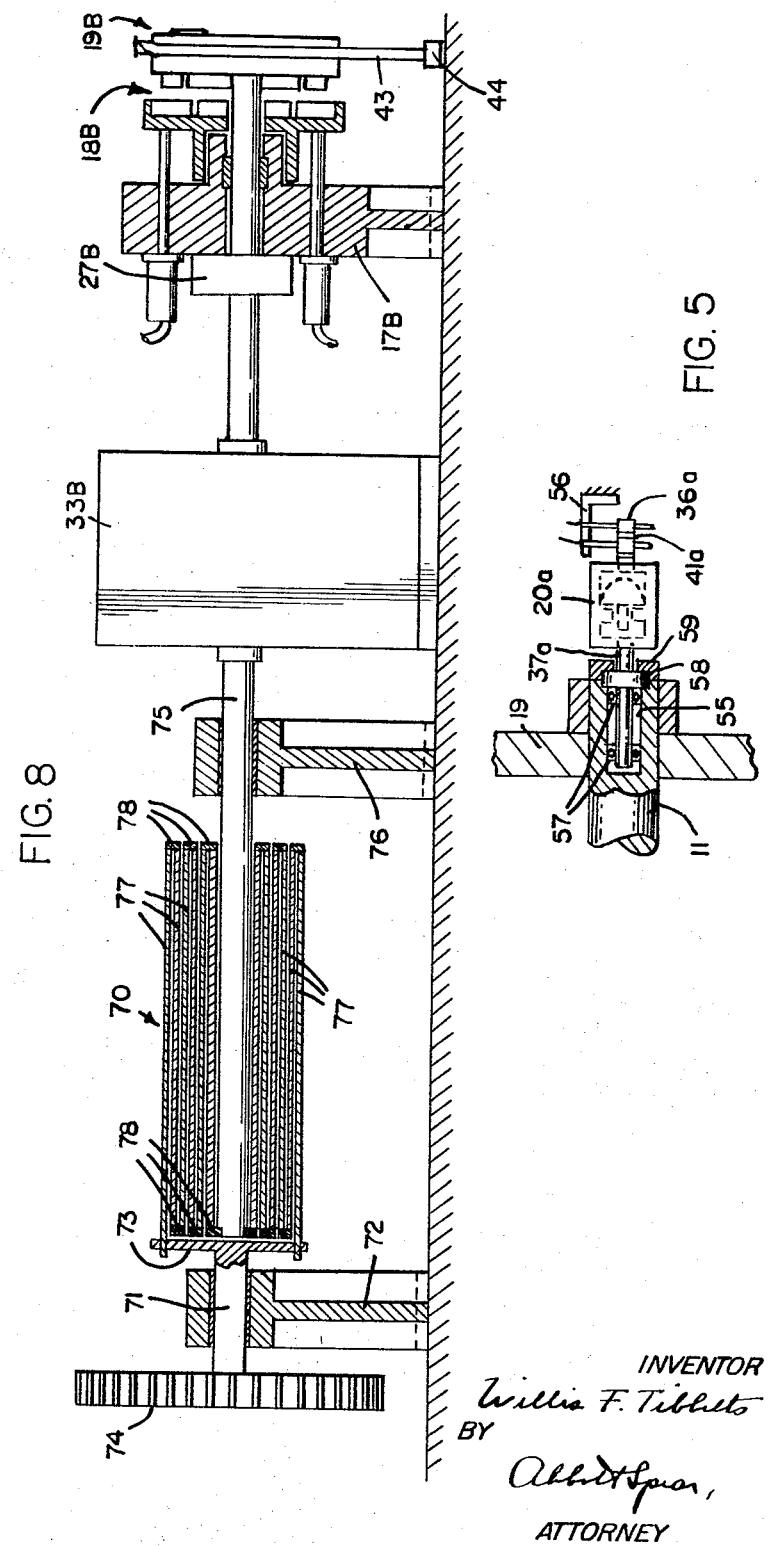

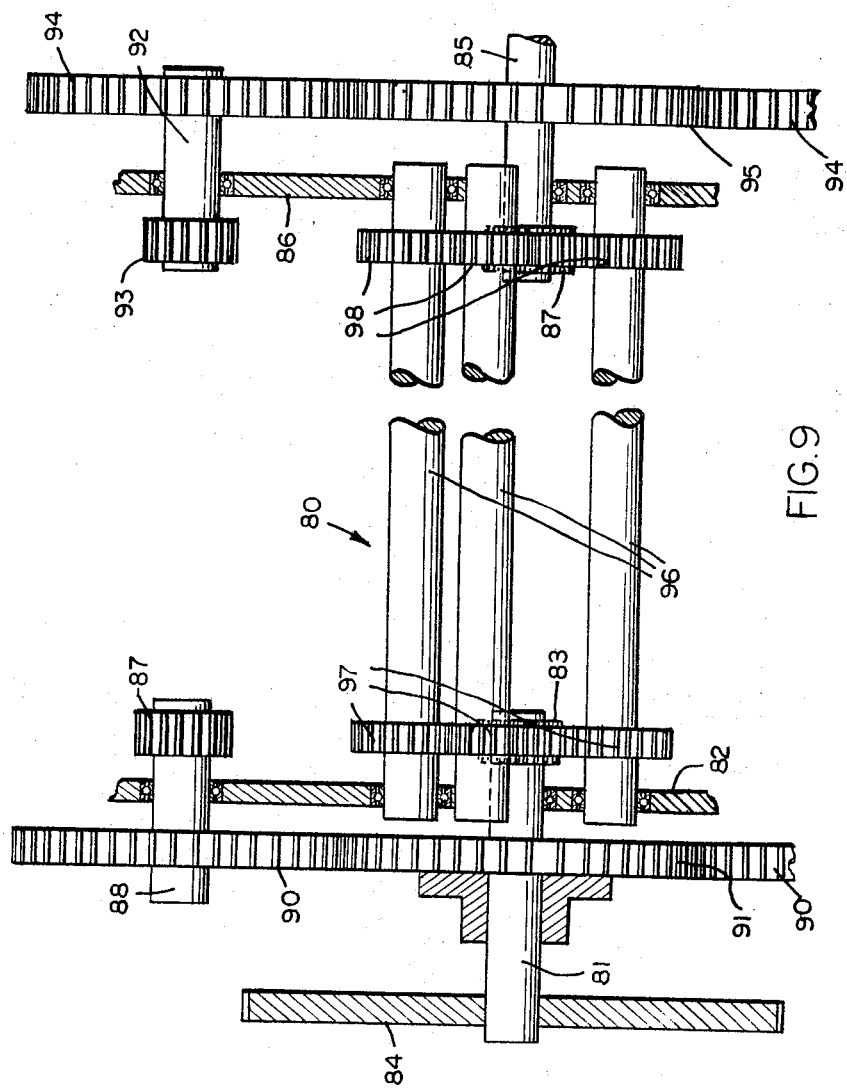

INVENTOR
Willis F. Tibbetts
BY
ATTORNEY

United States Patent Office 3,331,251
Patented July 18, 1967

3,331,251
APPARATUS FOR TESTING OBJECTS WITH FORCE GENERATED BY SUDDENLY RELEASED ENERGY
Willis F. Tibbetts, Reading, Mass., assignor to Norris Industries, Inc., Los Angeles, Calif., a corporation of California
Filed Aug. 21, 1964, Ser. No. 391,230
9 Claims. (Cl. 73—432)

The present invention relates to apparatus for use in subjecting an object to at least one force generated by the sudden release of a substantial amount of energy.

While apparatus in accordance with the invention is adapted for use with various objects and for various purposes, it is herein discussed with particular reference to the testing of fuzes under conditions simulating, in the laboratory, forces to which each would be subjected if fired as part of a projectile.

It will be appreciated that it is inherently difficult to approximate, in the laboratory, the conversion, at the appropriate rate, of substantial amounts of energy into one or more of the motions and of the magnitudes that occur in the actual firing of a shell in a gun and to apply such motion or motions to an object, such as a fuze, for test purposes in such a manner as to facilitate recovery of the object or its parts in order to evaluate the effects of the test forces applied thereto. At the present time, artillery fuze designs are evaluated by actual ballistics firings, an expensive and time-consuming procedure. The energy requirements of high linear velocity machines, such as air guns, are too substantial to render such machines suitable for laboratory uses and the distances over which the fuzes would be decelerated are necessarily too limited. In addition, centrifuges, while providing rotative speeds and G loads that are in useful ranges, require such times to come up to speed as to fail to simulate the actual rate of increase of the forces.

The general objective of the present invention is to provide apparatus operable to subject an object to at least one force generated by the sudden release of large amounts of energy. This general objective is attained by providing apparatus including a rotatable drive having resilient torsibility. The drive has a head at one end including a carrier for an object to be tested, releasable means to hold that end against rotation, and winding means connected to the other end of the drive and operable to so actuate the drive, when the releasable means are operative, as to store torsional resiliency therein until the releasable means are released. As such apparatus behaves as a torsional pendulum, means are provided to hold the carrier end of the drive at mid-cycle where the forces that would be applied during the second half cycle are not wanted, such holding means desirably being releasable, the retained energy then being available for use.

In its simplest form, the rotatable drive is a single shaft but its length, when such as to enable adequate torsional energy to be stored therein, is objectionable for most installations. Another objective of the present invention is, accordingly, the provision of rotatable drives including shaft sections, the sum total of whose length providing adequate storage capacity but which are associated as a relatively short battery such as one of parallel sections with one set of corresponding ends connected to a common winding gear and the other set of such ends meshing with a common driving gear, a group of such batteries with the winding gears all meshing with a driving gear of the winding means and the driving gears all meshing with a carrier driving gear, or as a battery with any two proximate shaft sections having the driving end of one in a radial zone inclusive of the driven end of the other and connected thereto, the shaft sections being either spaced and parallel with the connections being gears or concentric and tubular and the connections rigid.

Another general objective of the invention is to provide for the rotation of the object about its own axis to simulate, in the case of a fuze, the effect of rifling on a fired projectile. Specific objectives are to enable such spin tests to be made independently of or in conjunction with set-back force testing with or without the application of the set-back force thereto. A further objective is to utilize the rotation of the drive during a half cycle thereof to effect the spinning of the object.

Other objectives of the invention will become apparent as the illustrative embodiments of the invention shown in the accompanying drawings are described.

Figure 7:
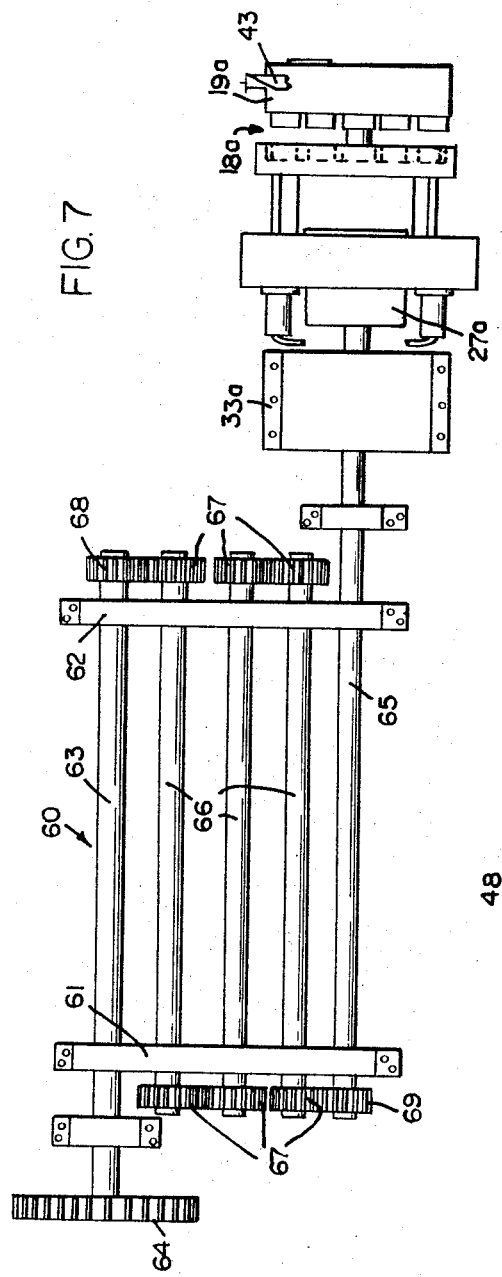
Figure 6:
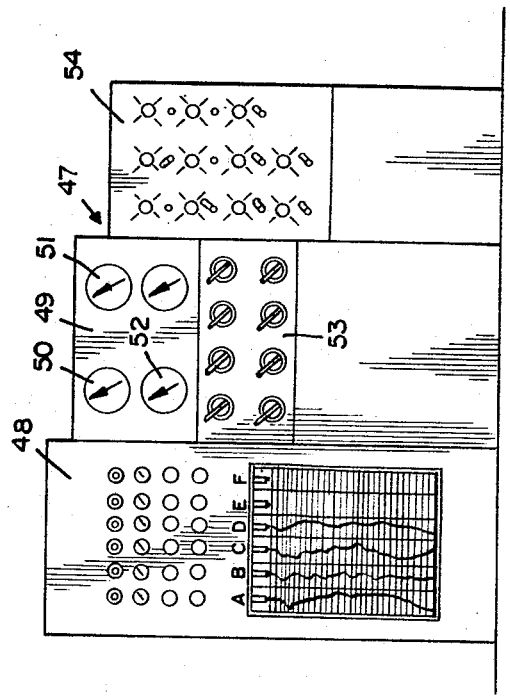
Figure 10:
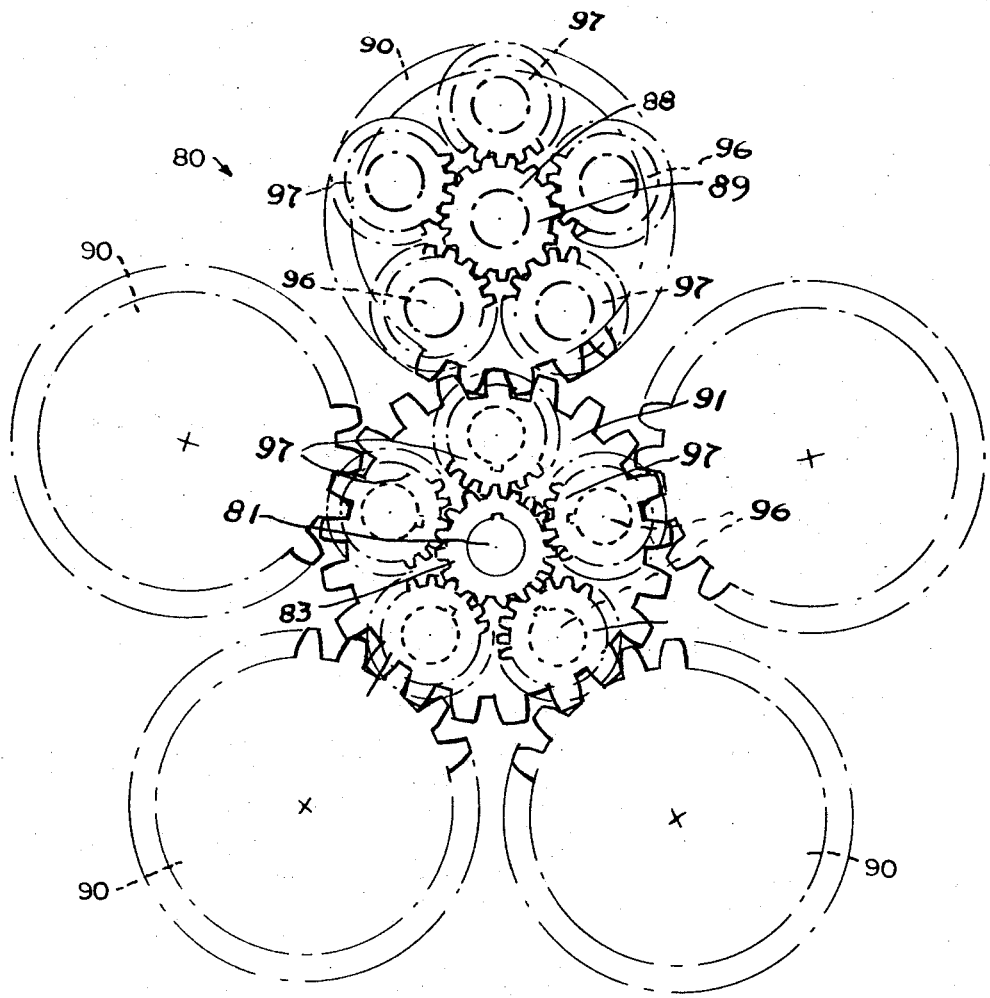

In the drawings:
FIGURE 1 is a partly sectioned and somewhat schematic view of apparatus in accordance with the invention,
FIGURE 2 is a fragmentary and partly sectioned view of the head end of the apparatus on an increased scale,
FIGURE 3 is a partly sectioned front view of the head, showing the carrier in one position,
FIGURE 4 is a somewhat schematic, cross sectional view of the clutch for arresting and holding the head at mid-cycle,
FIGURE 5 is a fragmentary and partly sectioned view of the head illustrating another position of the carrier,
FIGURE 6 is a view, on an increased scale, illustrating various controls,
FIGURE 7 is a side elevational view of another drive in accordance with the invention,
FIGURE 8 is a similar but partly sectioned view illustrating yet another drive,
FIGURE 9 is a partly sectioned, fragmentary side view illustrating a different embodiment of the invention, and
FIGURE 10 is a somewhat diagrammatic end view thereof.

In the embodiment of the invention illustrated by FIGURES 1–6, the apparatus is shown as having a generally indicated drive 10 consisting of a series of shaft sections 11 journalled in supports 12 and rigidly interconnected in an end-to-end relationship by couplings 13 to provide a long, unitary shaft. A speed reducer, generally indicated at 14, is shown as having a reversible motor 15 and as partly broken away to show a driving gear 16 fast on one end of an end shaft section 11.

The opposite end of the other end section 11 of the drive 10 is journalled in and extends through a support 17 and fast on the free end thereof and releasably locked thereto by a generally indicated clutch 18 is a head 19. The front face of the head is provided with a generally indicated carrier 20 for an indicated fuze 21, while the rear face thereof has a series of circumferentially spaced and rearwardly disposed clutch jaws 22. The support 17 has a hub 23 on which a clutch member 24 is slidably mounted so that its circumferentially spaced and forwardly disposed jaws 25 may be advanced into and retracted from a position in which the jaws 22 are in engagement therewith thereby to lock the head end of the drive 10 against rotation, such movements of the clutch member 24 being effected by means of a series of generally indicated hydraulically operated rams 26.

The support 17 is also provided with a generally indicated overrunning clutch 27. Such a clutch must, of course, be of substantial capacity and its showing in FIGURE 4 is simply for the purpose of illustrating its essential functions. Where a test is to be based on a first half cycle, the clutch 27 is necessary in order to permit free rotation of the drive 10 in one direction for the first half cycle and to prevent its turning in the opposite direction. The clutch 27 is, accordingly, operative to permit the drive 10 to turn in an unwinding direction when the clutch jaws 22 and 25 are disengaged during the first half cycle and then to lock the drive 10 automatically in a mid-cycle position. The energy then stored in the drive 10 may be then used for further testing by disengaging the clutch 27 or such energy may be dissipated by reversing the motor 15 to "unwind" the drive 10. The clutch 27, as shown in FIGURE 4, may consist of of an outer housing 28 providing a cylindrical chamber 29 and secured to the rear face of the support 17, a carrier 30, and a plurality of locking members 31 within the chamber 29 and of greater length than the distance between the subjacent drive shaft seats 11 and the housing 28 and pivotally connected to the carrier 30. The carrier 30 may be shifted from its FIGURE 4 position, in which it is operative to hold the drive 10 at mid-cycle, as by means schematically represented by the lever 32 indicated as yieldably held in locking position by a spring 32A and movable as by the ram 32B into a releasing position or, if so positioned before the release of the clutch 26, preventing mid-cycle interruption of the drive 10.

The drive 10 is also shown as under the control of a generally indicated brake 33 schematically represented as of the type having discs 34 fast on a shaft section 11, both faces of each disc being engageable by the clamping means 35 which are preferably of the hydraulically operated type.

Referring now to FIGURES 2 and 3, it will be seen that the fuze carrier 20 includes axially alined end spindles 36 and 37 rotatably supported by bearing units 38 and 39, respectively. The bearing units 38 and 39 are detachably located in appropriate ones of the series of transversely alined pairs of sockets 40, the series extending diametrically of the head 19.

The spindle 36 is provided with a slip ring assembly 41, while the spindle 37 has a spool 42. A steel band 43 has one end releasably caught on the spool 42 and is wound thereabout and trained about the periphery of the head 19 with its other end clamped by an anchor 44. With this arrangement, when the drive 10 rotates in response to the stored energy in the first half cycle, in the direction indicated by the arrows in FIGURE 3, the metal band 43 is pulled free from the spool 42 causing the carrier 20 to rotate thereby to spin the fuze 21 at a high rate.

In FIGURE 1, a room 45 is shown as located adjacent the head end of the drive 10, the room 45 having a safety door 46 and housing a generally indicated console 47, see FIGURE 6. The purpose of the slip ring assembly 41 is to provide the basis of operation of the six channels of the indicated recorder 48 of the console 47 by which desired information is made available as the fuze is subjected to a test. The console 47 also includes a panel 49 including a dial 50 to show, for example, the angular position of the fuze carrier 20, a dial 51 to show the torsional stress, and a dial 52 to show the hydraulic pressure. The console 47 also is provided with a panel 53 for a series of control switches, and a panel 54 for a series of program switches for controlling such adjustments as the angular setting of the fuze carrier 20, the angle of twist, the operation of the brake 33, hydraulic pressure, the operation of the clutch 18, and the like.

From the foregoing, it will be apparent that the apparatus may be prepared for a test of a fuze 21 with the shaft twisted to such an extent that, when the clutch 18 is released, the fuze is subjected to a predetermined setback force as one test. If desired, the band 43 may be attached to and wound on the spool 42 so that the fuze may be rotated to enable spin tests to be simultaneously taken.

In order that only spin tests may be made and these without any set-back effect on the fuze, the end of the shaft 11 exposed at the front of the head 19 is shown as having a socket 55 as may best be seen in FIGURE 5.

The fuze carrier 20A has spindles 36A and 37A, the spindle 36A having a slip ring assembly 41A mounted thereon and held by a bracket indicated at 56. The spindle 37A is supported in the socket 55 by bearings 57 and is provided with an overrunning clutch 58 whose outer casing is locked to the exposed shaft end as by a clamp 59. With this construction, when the clutch 18 is released, the fuze carrier 20A is rotated as it is connected to the drive by the clutch 58 which permits overrunning of the carrier at mid-cycle.

In the embodiment of the invention just described, the drive 10 is in the form of a unitary shaft of considerable length. As the length of the drive 10 and the diameter of its sections are determined by the amount of energy required for testing, the invention provides compact drives of adequate total length in order to avoid undue limitations on the magnitude of the forces that may be generated where space limitations exist.

One such compact drive is generally indicated at 60 in FIGURE 7. The drive 60 is shown as consisting of a battery of parallel shaft sections centrally journalled in supports 61 and 62 and including a shaft section 63 to be connected to a speed reducer such as that indicated at 14 in FIGURE 1, the shaft section 63 being shown as having a winding gear 64 as part of the speed reducing gear train. The drive 60 includes a shaft section 65 for the head 19A and controlled by the clutch 18A, the clutch 27A and the brake 33A.

Between the shaft sections 63 and 65 there are intermediate shaft sections 66 each having a gear 67 fast on each of its ends with one gear 67 of one shaft section 66 meshing with a gear 68 on the shaft section 63 and one gear 67 of another shaft section 66 meshing with a gear 69 on the shaft section 65. The other gears 67 are in meshing engagement to effect the serial connection of the intermediate shaft sections 66.

In FIGURE 8, another type of a compact drive is generally indicated at 70. The drive 70 includes a shaft section 71 journalled in a support 72 and provided with a head 73 at one end with its other end having a gear 74 as a part of the gear train of a speed reducer, such as the speed reducer shown in FIGURE 1. The drive 70 also includes a shaft section 75 journalled in the support 76 and the support 17B, provided with a head 19B, and controlled by the clutch 18B, the clutch 27B, and the brake 33B.

The drive also includes a battery of concentric, tubular shaft sections 77 with the largest being connected, at one end, to the head 73 and with the smallest such section freely receiving the shaft section 75 and having one end connected thereto. The ends of the other shaft sections 77 are secured one to another and to the largest and smallest of such sections as at 78 thus to effect their serial connection.

FIGURES 9 and 10 illustrate another embodiment of a compact drive which is generally indicated at 80. The drive 80 includes a shaft 81 journalled in the support 82 and provided with a gear 83 at one end and a gear 84 at the other end, the latter gear being one of the gears of a gear train of a speed reducer, such as the speed reducer 14 shown in FIGURE 1. Axially alined with the shaft 81 is a shaft 85 journalled in the support 86 and provided at one end with a gear 87, the shaft 85 being the shaft for the object carrying head, such as the head 19, and to be controlled by clutches such as the clutches 18 and 27, and by a brake, such as the brake 33.

Journalled in the support 82 are a plurality of shafts 88 each having at one end a gear 89 and at the other, a gear 90, each meshing with the gear 91 on the shaft 81. Axially alined with each shaft 88 is a shaft 92. Each shaft 92 includes a gear 93 at one end and a gear 94 at the other end, the gear 94 meshing with a gear 95 on the shaft 85. Journalled in the supports 82 and 86 are a plurality of shaft sections 96. Each shaft 96 has gears 97 and 98 with each gear 97 meshing with the gear 83 or a gear 89 and each gear 98 meshing with the gear 87 or a gear 93. In a drive such as the drive 80, there are thus established a plurality of parallel batteries of shaft sections each adapted to be wound up when the shaft 85 is held against turning to store a substantial amount of energy.

From the foregoing, it will be appreciated that the present invention is adapted to meet a wide range of requirements where substantial amounts of energy are to be stored under conditions permitting the sudden release thereof.

I claim:

1. In testing apparatus for subjecting an object to at least one force generated by the sudden release of a substantial amount of energy, a rotatable drive of substantial length and of resilient torsibility, said drive including at one end a carrier for the object, releasable means to hold said end against rotation, means connected to the other end of said drive and operable to actuate said drive in a direction and to an extent, when said releasable means are operative, storing torsional resiliency therein until said releasable means are released, means for measuring and indicating the force applied to the test object by the drive means and second releasable means of the over-running type operable automatically to hold said end in a mid-cycle position.

2. The apparatus of claim 1 in which the drive actuating means is reversible.

3. In testing apparatus for subjecting an object to at least one force generated by the sudden release of a substantial amount of energy, a rotatable drive of substantial length and of resilient torsibility, said drive including at one end a head and a carrier for the object rotatably supported by said head, releasable means to hold said end against rotation, means connected to the other end of said drive and operable to actuate said drive in a direction and to an extent, when said releasable means are operative, storing torsional resiliency therein until said releasable means are released, means to rotate said carrier, said means being driven by said drive when said drive is released to unwind, and means for measuring and indicating the force applied to the test object by the drive means.

4. In testing apparatus for subjecting an object to at least one force generated by the sudden release of a substantial amount of energy, a rotatable drive of substantial length and of resilient torsibility, releasable means to hold one end of said drive against rotation, a rotatable carrier supported by said end with its axis in alinement with the axis thereof and including an over-running clutch connection therewith, and means connected to the other end of said drive and operable to actuate said drive in a direction and to an extent, when said releasable means are operative, storing torsional resiliency therein until said releasable means are released, and means to rotate said carrier in response to the roation of the first named end of the drive, means for measuring and indicating the force applied to the test object by the drive means, said clutch means causing the rotation of said carrier in an unwinding direction only.

5. In testing apparatus for subjecting an object to at least one force generated by the sudden release of a substantial amount of energy, a rotatable drive of substantial length and of resilient torsibility, said drive including at one end a head, a rotatable carrier for the object mounted on said head, releasable means to hold said end against rotation, means connected to the other end of said drive and operable to actuate said drive in a direction and to an extent, when said releasable means are operative, storing torsional resiliency therein until said releasable means are released, and means to rotate said carrier, said last named means comprising a spool fixed on said carrier axially thereof, a flexible member wound about said spool with its free end attached to an anchor so located that said flexible member is unwound to rotate said carrier as said head is turned by said drive in an unwinding direction, and means for measuring and indicating the force applied to the test object by the drive means.

6. The apparatus of claim 5 in which the carrier is mounted with its axis of rotation radially of said head.

7. The apparatus of claim 5 in which the head is circular and the flexible member is trained about a part of its periphery.

8. In testing apparatus for subjecting an object to at least one force generated by the sudden release of a substantial amount of energy, a rotatable drive of substantial length and of resilient torsibility, said drive including at one end a carrier for the object, releasable means to hold said end against rotation, means connected to the other end of said drive and operable to actuate said drive in a direction and to an extent, when said releasable means are operative, storing torsional resiliency therein until said releasable means are released, means for measuring and indicating the force applied to the test object by the drive means and brake means in control of said drive operable automatically to engage and stop said drive in a mid-cycle position.

9. In testing apparatus for subjecting an object to at least one force generated by the suddent release of a substantial amount of energy, a rotatable drive of substantial length and of resilient torsibility, said drive including at one end a carrier for the object, releasable means of the jaw type to hold said end against rotation, means connected to the other end of said drive and operable to actuate said drive in a direction and to an extent, when said releasable means are operative, storing torsional resiliency therein until said releasable means are released, means for measuring and indicating the force applied to the test object by the drive means, releasable means of the disc type of the over-running type operable to hold said end in a mid-cycle position, and brake means operable to brake the turning of said end.

References Cited

UNITED STATES PATENTS

| 1,796,183 | 3/1931 | Anderson | 185—37 X |
| 2,355,092 | 8/1944 | Meister | 73—167 |
| 3,058,361 | 10/1962 | Freeborn | 267—57 X |
| 3,126,070 | 3/1964 | Hayek | 185—37 |

RICHARD C. QUEISSER, Primary Examiner.

J. W. MYRACLE, Assistant Examiner.